United States Patent

[11] 3,609,074

| [72] | Inventors | Nicolino Rainaldi<br>Mestre;<br>Pierluigi Fatutto, Venezia, both of Italy |
|---|---|---|
| [21] | Appl. No. | 827,959 |
| [22] | Filed | May 26, 1969 |
| [45] | Patented | Sept. 28, 1971 |
| [73] | Assignee | Montecatini Edison S.p.A.<br>Milan, Italy |
| [32] | Priority | May 28, 1968 |
| [33] | | Italy |
| [31] | | 17,004 A/68 |

[54] FLAME-EXTINGUISHING COMPOSITIONS COMPRISING 1,2-DIBROMO-TETRAFLUOROETHANE
5 Claims, No Drawings

[52] U.S. Cl. ..................................... 252/3,
   252/8, 252/8.05, 252/307
[51] Int. Cl. ..................................... A62d 1/00
[50] Field of Search .......................... 252/3, 6.5,
   8, 8.05, 307, 311

[56] References Cited
UNITED STATES PATENTS

| 2,653,130 | 9/1953 | Eiseman, Jr. ............... | 252/8 |
| 2,949,426 | 8/1960 | Thiegs ....................... | 252/8.05 |
| 3,258,423 | 6/1966 | Tuve et al. .................. | 252/8.05 |
| 3,479,286 | 11/1969 | Gamboretto et al. ......... | 252/3 |

FOREIGN PATENTS

| 1,080,111 | 8/1967 | Great Britain ............... | 252/3 |

*Primary Examiner*—Douglas J. Drummond
*Assistant Examiner*—D. J. Fritsch
*Attorney*—Karl F. Ross

ABSTRACT: Flame-extinguishing foam-forming composition containing 5–25 percent by weight of a bromine-containing halogen-saturated alkane of low carbon number ($C_1$ to $C_6$), preferably symmetrical 1,2-dibromotetrafluoroethane. The composition also contains substances conventional in foaming, liquid, flame-extinguishing compositions, e.g., water, emulsifiers or foam-stabilizing surface-active agents, propellants, antifreezing liquids, corrosion inhibitors, buffer substances, thickening and carrying agents.

FLAME-EXTINGUISHING COMPOSITIONS COMPRISING 1,2-DIBROMO-TETRAFLUOROETHANE

Our present invention relates to flame-extinguishing compositions of the foaming type and, more particularly, to flame-extinguishing foam-forming liquid compositions containing one or more fluorobromoalkanes.

It is known to provide flame-extinguishing foam-forming liquid compositions which consist essentially of one or more foaming agents in a water system together with an organic emulsifying agent which stabilizes the aqueous dispersion and the foam product thereby. In such systems, it has been proposed to use air mixed with water under pressure as the foaming agent alone or together with chlorofluoroalkanes, which also may be used alone, to constitute a foaming and/or propelling agent. The liquid compositions are usually stored in a pressure-sustaining vessel and are driven by the propellant through the nozzle so that the liquid emerges as a foam. The flame-extinguishing properties of such foams derive from the fact that, on the one hand, a stable foam covering a combustible material will exclude oxygen from the combustion site and effectively choke off the flame. On the other hand, the foams absorb heat at the combustion site and thereby cool the combustion zone and prevent spread of the fire.

Conventional flame-extinguishing foaming compositions have several disadvantages, however. Thus, earlier foam compositions have not been found to be particularly flame-resistant, i.e., in the region of combustion the foam breaks down under heat and eventually allows atmospheric oxygen to penetrate to the combustion site and sustain further combustion or is rapidly vaporized so that further utility of the foam as a cooling medium is lost. Also the hitherto existing foams appear to be incapable of preventing reignition and often even sustain flashback. The term "flashback" is used in the art to describe the effect when flame bursts backwardly through an opening in the foam layer to the underlying combustible material and reignites the latter to continue the burning process. Still another disadvantage of earlier systems, namely those mentioned above in which chlorofluoroalkanes form the propellant or carbon dioxide constitutes the propellant, is that the compositions are not able to be used in long-distance jets and thus are frequently unsatisfactory when difficulties are encountered in approaching the combustion site.

It is, therefore, the principal object of the present invention to provide an improved flame-extinguishing foaming-liquid composition, in which the aforementioned disadvantages are obviated and a more stable foam of greater flame and heat resistance is obtained.

Another object of this invention is to provide a flame-extinguishing composition which will prevent flashback or reignition once the foam is used to blanket a combustible material.

Another object of our invention is the provision of a flame-extinguishing composition which can be propelled over long distances, i.e., is adapted to create long-distance jets.

Still a further object of the instant invention is to provide a flame-extinguishing composition for the purposes described, which gives rise to a long-lasting foam resistant to flame and heat and particularly suitable in extinguishing fires on combustible organic liquids.

These objects and others which will become apparent hereinafter, are attained, in accordance with the present invention, with a flame-extinguishing foam-forming liquid composition containing the substances of conventional compositions mentioned above, but in addition, being provided with one or more fluorobromoalkanes. As will be apparent hereinafter, reference to the customary components of such compositions is intended to include water, emulsifying and foam-stabilizing surface-active agents, propellants and foaming agents, antifreezing agents capable of lowering the freezing point of the composition, buffering agents, corrosion inhibitors, thickening and carrying agents.

The fluorobromoalkanes which are employed according to the present invention, in an amount of about 5–25 percent by weight of the composition, are the bromine-containing halogen-saturated alkanes of low carbon number, e.g., having one to six carbon atoms in the main chain. While fluorochlorobromoalkane may be used, the compounds having one or more chlorine atoms in addition to bromine and fluorine atoms, we prefer to make use of halogen-saturated alkanes in which all of the halogen is exclusively bromine and fluorine. Best results are obtained with compounds containing at least four fluorine atoms and at least two bromine atoms per molecule and we prefer to use tetrafluorodibromoethane.

We have discovered, most surprisingly, in view of the known properties of fluorochloroalkanes in foaming-liquid flame extinguishing compositions, that the compositions of the present invention have remarkably improved properties including a shorter flame-extinguishing time, a smaller consumption of the foaming liquid, practically total exclusion of flashback, excellent fire resistance and perfect and uniform adhesion to metal walls at high temperatures, thereby markedly improving the stability of the foam. It has also been discovered that the small foam bubbles contain, homogeneously distributed therein, a fluorobromoalkane vapor which makes impossible reignition of a flammable liquid which may accidentally be spread over the foam surface and also bars reignition of underlying combustible liquids even when an opening is formed in the foam blanket. The compositions of the present invention may readily be used in fire extinguishers whose jets are to cover 30–60 m., far in excess of the distances attainable with conventional foams using similar nozzles.

While we have mentioned that the fluorobromoalkanes may be used in an amount ranging from 5 to 25 percent by weight, we prefer to employ 7 to 15 parts by weight of the fluorobromoalkane per 100 parts by weight of the composition. Best results are obtained with the bromofluoro and bromofluorochloro derivatives of methane, ethane and propane while sym-$C_2F_4Br_2$ (1,2-dibromotetrafluoroethane) is most exceptional.

We have also found that, among the components of flame-extinguishing compositions used heretofore and with which the fluorobromoalkane may be employed in accordance with the present invention, there are specific compounds which perform with surprising superiority, when used in conjunction with the fluorochloroalkanes of the present invention.

Thus, among the surface-active agents which may be used in accordance with the present invention in flame-extinguishing compositions, we have found the most suitable to be organic sulfonates and sulfates; alkylarylpolyethyleneglycol ethers; esters of alcohols such as sorbitol with higher fatty acids such as lauric, stearic, palmitic acids; sodium or ammonium salts of sulfocarboxylic acid such as dialkylsulfosuccinic acid (with up to eight carbon atoms in the alkyl group).

As noted earlier, the composition should include, in addition to the fluorobromoalkane, provided in accordance with the present invention, at least one and possibly a plurality of propellants, preferably an inert gas (i.e., a gas inert to chemical reaction with the components of the composition and with as low corrosivity as possible) and/or a chlorofluoroalkane of the refrigerant type having a low boiling point (well below ambient temperature so that the vapor pressure of the propellant will be substantial at normal temperature). Inert gases suitable for the purposes of the present invention include nitrogen, carbon dioxide and sulfurhexafluoride ($SF_6$) while the preferred chlorofluoroalkanes are those containing up to six halogen atoms and one or two carbon atoms, the halogens being exclusively chlorine and fluorine. Of greatest desirability are the compounds $CHClF_2$, $CCl_2F_2$, $CClF_3$ and $CF_4$, i.e., the chlorofluoromethanes.

When relatively long spray jets or streams are desirable, compressed air, compressed nitrogen or the like may be used as foaming agents and the foam mechanically projected to the combustion site, e.g., by pumps or compressors.

The antifreezing agents, corrosion inhibitors, buffer substances, thickening and carrying agents and like components of the composition of the present invention may be chosen from the compounds widely used for the corresponding purpose in conventional compositions. Of particular note in conjunction with the compositions of the present invention, however, are ethylene or propyleneglycol insofar as polyalcohol types of freezing point lowering compounds are concerned. The preferred corrosion inhibitors are (sodium or potassium) nitrites, phosphates, polyphosphates or amino alcohols such as triethanolamine. The corrosion inhibitors act as basic substances reactive with any acidity present in the composition and may serve as buffering substances as is the case with alkaline (sodium or potassium) phosphate. The alkali (sodium or potassium) silicates are the preferred thickening and carrying agents in the composition of the present invention.

Example 1

Two liquid foam-forming compositions according to this invention were prepared with formulations as given in the following table:

TABLE 1

| Component | Unit Quantity | A | B |
|---|---|---|---|
| Surfactant | | | |
| $-T_1$ | g. | 140 | 140 |
| Antifreeze agent | | | |
| ethylene-glycol | g. | 120 | |
| Corrosion inhibitor | | | |
| $NaNO_2$ | g. | 1.5 | |
| Buffering agent | | | |
| $NaH_2PO_4$ | g. | 6.5 | |
| Propellant | | | |
| $P_1$ | g. | 65 | 65 |
| $P_2$ | g. | 55 | 55 |
| Symmetrical $C_2F_4Br_2$ | g. | 100 | 100 |
| Other additives | | | |
| potassium silicate* | g. | 70 | 70 |
| urea | g. | | 120 |
| water | g. | 442 | 450 |

Notes to Table 1:
$T_1$ = 30 percent aqueous solution of the sodium salt of the suphate of a laurilic ether;
$P_1$ = Edifren 12, $CCl_2F_2$, (trademark of Montecatini Edision S.p.A.);
$P_2$ = Edifren 22, $CHClF_2$ (trademark of Montecatini Edision S.p.A.);

*The potassium silicate is used in a 30 percent aqueous solution.

The fire-extinguishing tests with the two above-described compositions were carried out on ignited gasoline-Diesel oil mixtures (1:1 ratio) in rectangular vessels having a surface of 1.5 sq.m.

The compositions were jetted onto the fire in the form of foams, using pressurized containers fitted with suitable ejection nozzles held about 5 meters distant from the fire. In table 2 we have reported the fire-extinguishing characteristics of the two compositions A and B according to this invention, compared with two compositions of the known type respectively identified C and D. Composition C, similar to that according to the invention but differing in that compositions C and D do not contain $C_2F_4Br_2$, while composition D consists of a mixture of hydrolizable metal salts of organic acids.

TABLE 2

| Characteristics | Compositions | | | |
|---|---|---|---|---|
| | A | B | C | D |
| Precombustion time | 10 sec | 10 sec | 30 sec. | 30 sec. |
| Extinguishing time | 12 sec | 13 sec. | 14 sec. | 27 sec. |
| Extinguishing composition discharged ** | 2.6 kg. | 2.8 kg. | 3.6 kg. | 9 kg. |
| Reignition of foam (artificial ignition)*** | none | none | yes | yes |
| Flash-back | none | none | none | none |
| Heat resistance | high | high | poor | fair |

** at 5 percent of active substances, the balance being exclusively water.
*** Test conducted by besprinkling the foam with an inflammable liquid and tentatively causing its ignition.

As can be observed, the compositions according to this invention, in comparison with composition C, proved to be extremely more effective, so much so that: other characteristics remaining the same, there is a considerable reduction in the discharge of the quantity necessary for extinguishing the fire; they generate foams that rapidly inhibit artificial reignition of the inflammable liquids intentionally spread on the foams; they are particularly resistant to the destructive action of fire; and they often achieve the extinguishing of the flame even before having completely covered up the ignited surface.

Furthermore they avoid flashback phenomena, that is, the foams generated by these compositions hinder passage of inflammable vapors coming from the surface below, at which the flame has shortly prior thereto been extinguished through the foams.

Finally with regard to composition D there was obtained a considerable reduction in the extinguishing time as well as in the consumption of the quantity of composition required for extinguishing fire.

Example 2

A liquid foaming composition was prepared having the following composition:

| | |
|---|---|
| Surfactant | |
| $-T_1$ (see example I) | 25 parts by weight |
| $-T_2$ (nonlphenyl-polyethylene-glycolether glycolether i.e. Terigtol-NPX-trademark of Union Carbide | 7.5 parts by weight |
| Antifreeze substance | |
| -ethylene-glycol | 7.5 parts by weight |
| $C_2F_4Br_2$ | 60 parts by weight |

This composition was added, at the moment of ejection, to a quantity of water equal to 70 percent of the composition, and the composition was then used as a jettable mixture in a standard apparatus used in current practice, which consisted of a hydrant for water at a pressure of 12 kg./cm.$^2$, a premixer for mixing the pressurized water with the liquid $C_2F_4Br_2$-containing composition, and of a jetting device through which the mixture of water-liquid composition is jetted out after having been mixed with compressed air. It is to be noted that this composition can be successfully jetted to distances from 40 to 60 meters.

We claim:

1. A flame-extinguishing foam-forming composition consisting essentially of 7 to 15 percent by weight sym-$C_2F_4Br_2$, water, at least one foaming agent selected from the group which consists of nitrogen, carbon dioxide and sulfurhexafluoride, an emulsifying agent selected from the group which consists of organic sulfonates, organic sulfates, alkylarylpolyethylene glycol ethers, esters of sorbitol with lauric, stearic or palmitic acid, and sodium and ammonium salts of sulfocarboxylic acids, an antifreeze substance selected from the group which consists of ethylene glycol and propylene glycol, and at least one compound selected from the group which consists of alkali-metal nitrites, phosphates, and polyphosphates and triethanolamine.

2. A flame-extinguishing foam-forming composition consisting essentially of 7 to 15 percent by weight sym-$C_2F_4Br_2$, water, at least one foaming agent selected from the group which consists of nitrogen, carbon dioxide and sulfurhexafluoride, an emulsifying agent selected from the group which consists of organic sulfonates, organic sulfates, alkylarylpolyethylene glycol ethers, esters of sorbitol with lauric, stearic or palmitic acid, and sodium and ammonium salts of sulfocarboxylic acids, an antifreeze substance selected from the group which consists of ethylene glycol and propylene glycol, at least one compound selected from the group which consists of alkali-metal nitrites, phosphates and polyphosphates and triethanolamine, said composition further including a fluorochloroalkane propellant.

3. The composition defined in claim 2 wherein said propellant is a chlorofluoromethane.

4. A flame-extinguishing foam-forming composition consisting essentially of 140 parts by weight of a 30 percent aqueous solution of the sodium salt of laurilic ether sulfate, 120 parts by weight of ethylene glycol, 1.5 parts by weight of sodium nitrite, 6.5 parts by weight $NaH_2PO_4$, 65 parts by weight $CCl_2F_2$, 55 parts by weight $CHClF_2$, 100 parts by weight of symmetrical $C_2F_4Br_2$, 70 parts by weight of a 30 percent aqueous solution of potassium silicate, 442 parts by weight water.

5. A flame-extinguishing foam-forming composition consisting essentially of 140 parts by weight of a 30 percent aqueous solution of the sodium salt of laurilic ether sulfate, 65 parts by weight of $CCl_2F_2$, 55 parts by weight $CHClF_2$, 100 parts by weight of symmetrical $C_2F_4Br_2$, 70 parts by weight of a 30 percent aqueous solution of potassium silicate, 120 parts by weight urea, and 450 parts by weight of water.